(12) United States Patent
Goldwitz

(10) Patent No.: US 12,365,380 B2
(45) Date of Patent: Jul. 22, 2025

(54) FOLDABLE DOOR CART

(71) Applicant: Brian Goldwitz, Waterbury, CT (US)

(72) Inventor: Brian Goldwitz, Waterbury, CT (US)

(*) Notice: Subject to any disclaimer, the term of this patent is extended or adjusted under 35 U.S.C. 154(b) by 0 days.

(21) Appl. No.: 18/662,893

(22) Filed: May 13, 2024

(65) Prior Publication Data
US 2024/0294199 A1 Sep. 5, 2024

Related U.S. Application Data

(63) Continuation-in-part of application No. 17/952,184, filed on Sep. 23, 2022.

(51) Int. Cl.
*B62B 3/02* (2006.01)
*B62B 3/10* (2006.01)

(52) U.S. Cl.
CPC ............ *B62B 3/022* (2013.01); *B62B 3/108* (2013.01); *B62B 2205/26* (2013.01)

(58) Field of Classification Search
CPC .. B62B 1/268; B62B 1/12; B62B 1/00; B62B 1/26; B62B 1/04; B62B 1/042; B62B 3/108; B62B 3/02; B62B 3/00; B62B 3/10; B62B 3/022; B62B 2205/26; B62B 2205/00
See application file for complete search history.

(56) References Cited

U.S. PATENT DOCUMENTS

| | | | | |
|---|---|---|---|---|
| 2,418,586 A | * | 4/1947 | Jenkins | B62B 3/108 |
| | | | | 187/244 |
| 2,604,210 A | * | 7/1952 | Boone | B62B 1/268 |
| | | | | 280/47.35 |
| 2,967,627 A | * | 1/1961 | Vinson | B62B 3/02 |
| | | | | 254/2 R |
| 3,104,890 A | * | 9/1963 | Hill | B62B 1/12 |
| | | | | 280/47.27 |
| 3,643,935 A | * | 2/1972 | Bell | E04F 21/0023 |
| | | | | 269/84 |
| 3,804,432 A | * | 4/1974 | Lehrman | B62B 1/12 |
| | | | | 280/654 |
| 4,050,671 A | * | 9/1977 | Coleman | B62B 3/108 |
| | | | | 254/7 R |
| 4,505,495 A | * | 3/1985 | Foss | B62B 3/02 |
| | | | | 16/113.1 |
| 4,810,151 A | * | 3/1989 | Shern | E04F 21/0023 |
| | | | | 414/11 |
| 4,813,701 A | * | 3/1989 | Balland | B62B 3/027 |
| | | | | D12/129 |
| 4,865,346 A | * | 9/1989 | Carlile | B62B 1/12 |
| | | | | 280/654 |

(Continued)

*Primary Examiner* — James M Dolak
(74) *Attorney, Agent, or Firm* — Furr Law Firm; Jeffrey M. Furr

(57) ABSTRACT

The current invention is a foldable door frame holder cart with a rounded support bar in the middle of a base holding a door frame. The base has a plurality of wheels in the preferred embodiment. The device has a plurality of doors support bars and adjustable door locking bars connected to the support bars which the hinges of the door frame fit into. The adjustable door locking bars are connected to a thumb-turn bracket which can be used to better secure the door frame to the device. The device without the door with door frame guides that extend up from the top of the base. The cart can carry multiple doors and can fold into a smaller shape for storage.

9 Claims, 13 Drawing Sheets

(56) References Cited

U.S. PATENT DOCUMENTS

| | | | | |
|---|---|---|---|---|
| 4,921,270 A * | 5/1990 | Schoberg | B62B 1/002 | 414/490 |
| 4,932,639 A * | 6/1990 | Fjellstrom | B66F 3/08 | 269/71 |
| 4,978,132 A * | 12/1990 | Wilson | E04F 21/0023 | 280/47.131 |
| D325,505 S * | 4/1992 | Hernandez | E04F 21/0023 | 414/11 |
| 5,135,205 A * | 8/1992 | Bedard | B66F 9/02 | 269/71 |
| 5,244,221 A * | 9/1993 | Ward | B62B 1/14 | 414/490 |
| 5,257,892 A * | 11/1993 | Branch | B62B 3/02 | 280/30 |
| 6,024,348 A * | 2/2000 | Ventura | B05B 13/0285 | 269/104 |
| 6,231,034 B1 * | 5/2001 | Walker | E04F 21/0023 | 269/901 |
| 6,505,844 B2 * | 1/2003 | Hallman | E04F 21/0023 | 118/500 |
| 6,811,038 B1 * | 11/2004 | Sanderson | A47B 81/00 | 211/13.1 |
| 7,008,165 B1 * | 3/2006 | Grimes | B66F 9/06 | 414/800 |
| 7,008,166 B1 * | 3/2006 | Grimes | B66C 23/48 | 254/114 |
| 7,175,168 B2 * | 2/2007 | Hardaker | B64F 5/50 | 29/430 |
| 7,419,170 B2 * | 9/2008 | Krizan | B62B 3/108 | 280/47.35 |
| 7,780,389 B1 * | 8/2010 | Young | B66F 19/00 | 414/11 |
| 7,784,802 B2 * | 8/2010 | White | B62B 3/108 | 280/47.41 |
| 8,088,984 B2 * | 1/2012 | Meyer | G10G 7/005 | 84/421 |
| 9,371,655 B1 * | 6/2016 | Davis | E04F 21/0007 | |
| 10,160,467 B2 * | 12/2018 | Josephsen | B62B 1/12 | |
| 10,376,045 B1 * | 8/2019 | Poudrier | B62B 3/002 | |
| 10,981,588 B1 * | 4/2021 | Poudrier | B62B 3/02 | |
| 11,097,759 B1 * | 8/2021 | Poudrier | B62B 3/008 | |
| 11,172,761 B2 * | 11/2021 | Van Zile, Jr. | A47B 43/00 | |
| 11,192,566 B2 * | 12/2021 | Ceja | B62B 3/008 | |
| 11,390,309 B2 * | 7/2022 | Candelario | B62B 3/005 | |
| 11,654,947 B1 * | 5/2023 | Poudrier | B62B 3/008 | 211/13.1 |
| 11,718,334 B1 * | 8/2023 | Yao | B62B 3/10 | 280/47.35 |
| 12,172,875 B2 * | 12/2024 | McCormick | B66F 5/02 | |
| 12,227,217 B1 * | 2/2025 | Esau | B62B 3/108 | |
| 2019/0331291 A1 * | 10/2019 | Poudrier | F16M 11/22 | |

* cited by examiner

FOLDABLE DOOR CART

RELATED APPLICATIONS

This application is a Continuation-in-part of U.S. application Ser. No. 17/952,184 filed on Sep. 23, 2022 and claims its priority date and is incorporated by reference.

TECHNICAL FIELD

The technology discussed below relates door carts and more particularly making it easier to remove, store and move the doors.

BACKGROUND

Many people who enjoy outdoor activities own sport utility vehicles (SUVs) with doors that can be removed in order to give occupants more outdoor pleasure while riding in the vehicle. The doors, once removed, need to be stored in appropriate fashion in order to prevent damage to them. As such doors are relatively bulky and heavy, such storage is not an easy task. Laying the doors on a ground surface is not satisfactory as that can cause damage to the door, especially to its finish. Therefore, some devices are available for storing the doors, but such devices do not offer any purpose beyond this singular purpose and are not otherwise of particular utility when not serving in their intended purpose and are they themselves relatively large and bulky.

What is needed is a device that is designed to easily and effectively hold a vehicle door or hard top that is removed from the vehicle so as to prevent the door or hard top from becoming damaged or removing the hard top for an open feeling. Such devices must be able to easily move about the ground level when the doors or hard top are being held by the devices. Such a device must have substantial utility beyond the task of holding and moving vehicle doors or hard top about so that the device is multipurpose in its functioning. Such a device must provide support for a variety of articles as defined by the users' needs and also be relatively small and compact when not in use for ease of storage or transport of the device.

There is still room for improvement in the art.

SUMMARY

The current invention is a new device to hold removed doors from a jeep or SUV in a new and novel way.

The current invention is a new design to a foldable door frame holder cart with a rounded support bar in the middle of a base holding a door frame. The base has a plurality of wheels in the preferred embodiment. The device has adjustable prongs which the hinges of the door frame fit into. The adjustable bracket such as a thumb-turn bracket which can be used to better secure the door frame to the device. The device has door frame guides that extend up from the top of the base.

These are improvements over the current art.

DRAWINGS

FIG. 6 shows the door holder in a folded position.

Figure 7:
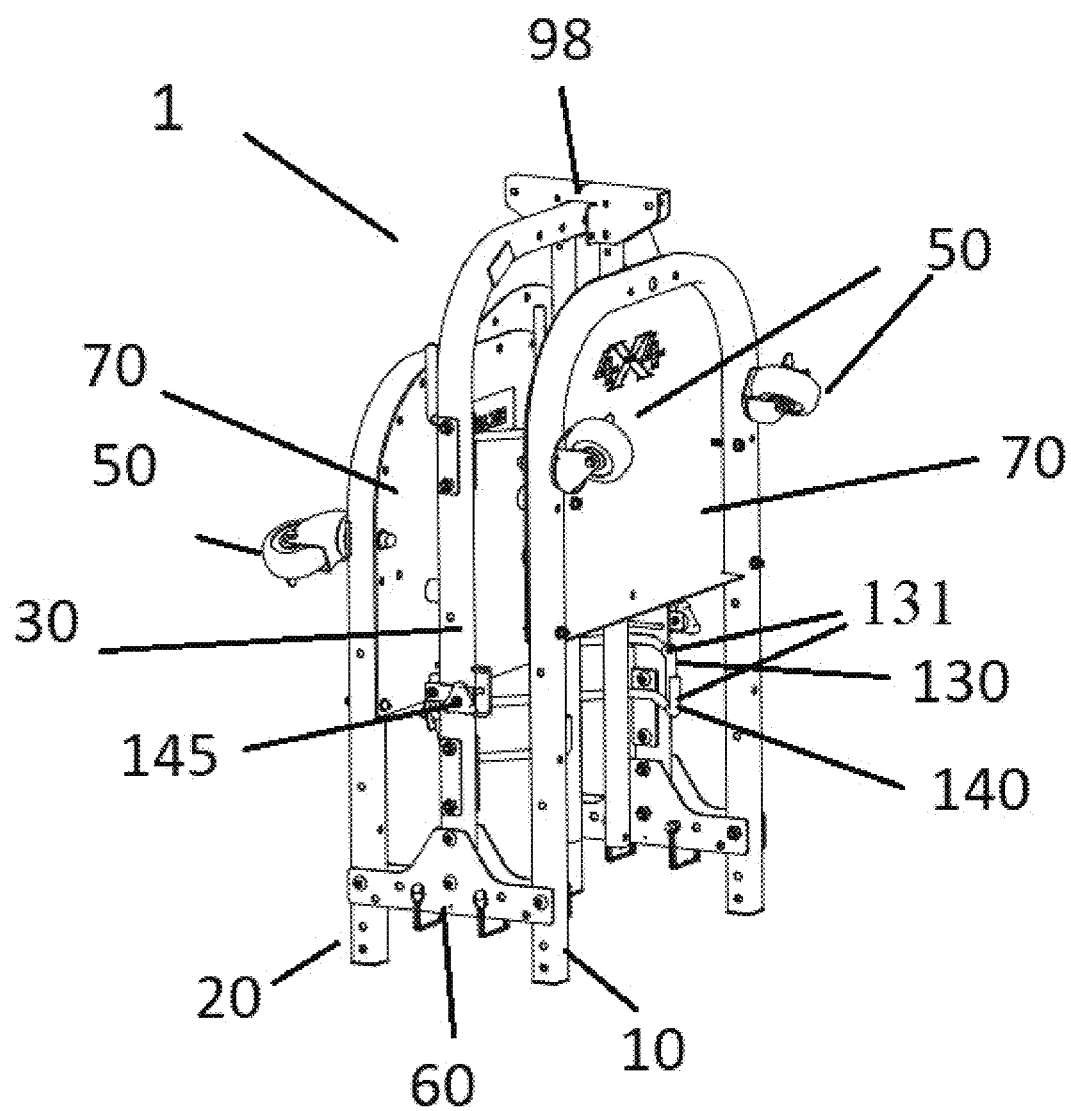

FIG. 7 displays an elevated side view of the door holder.

Figure 8:
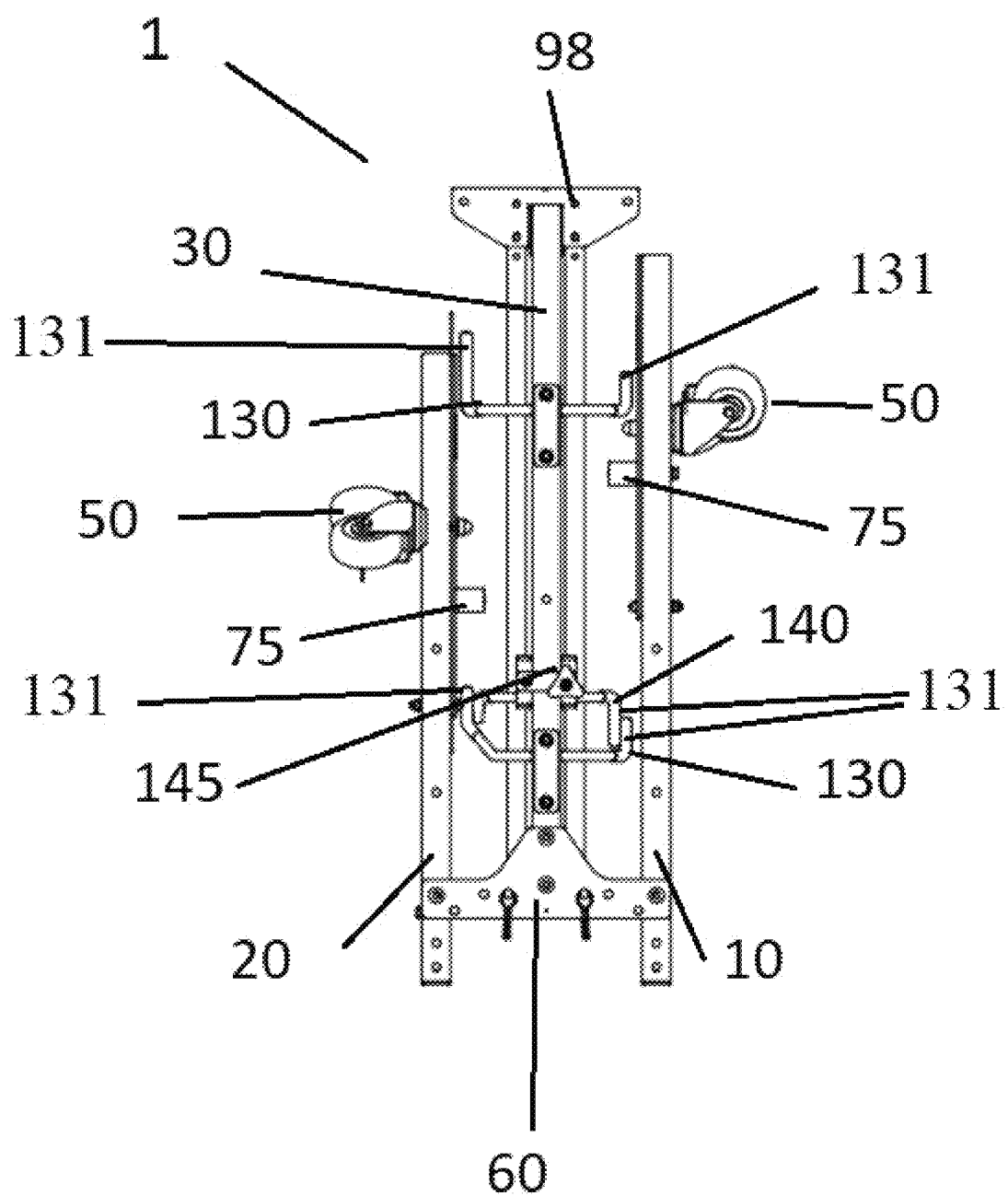

FIG. 8 shows a side view of the door holder.

Figure 9:
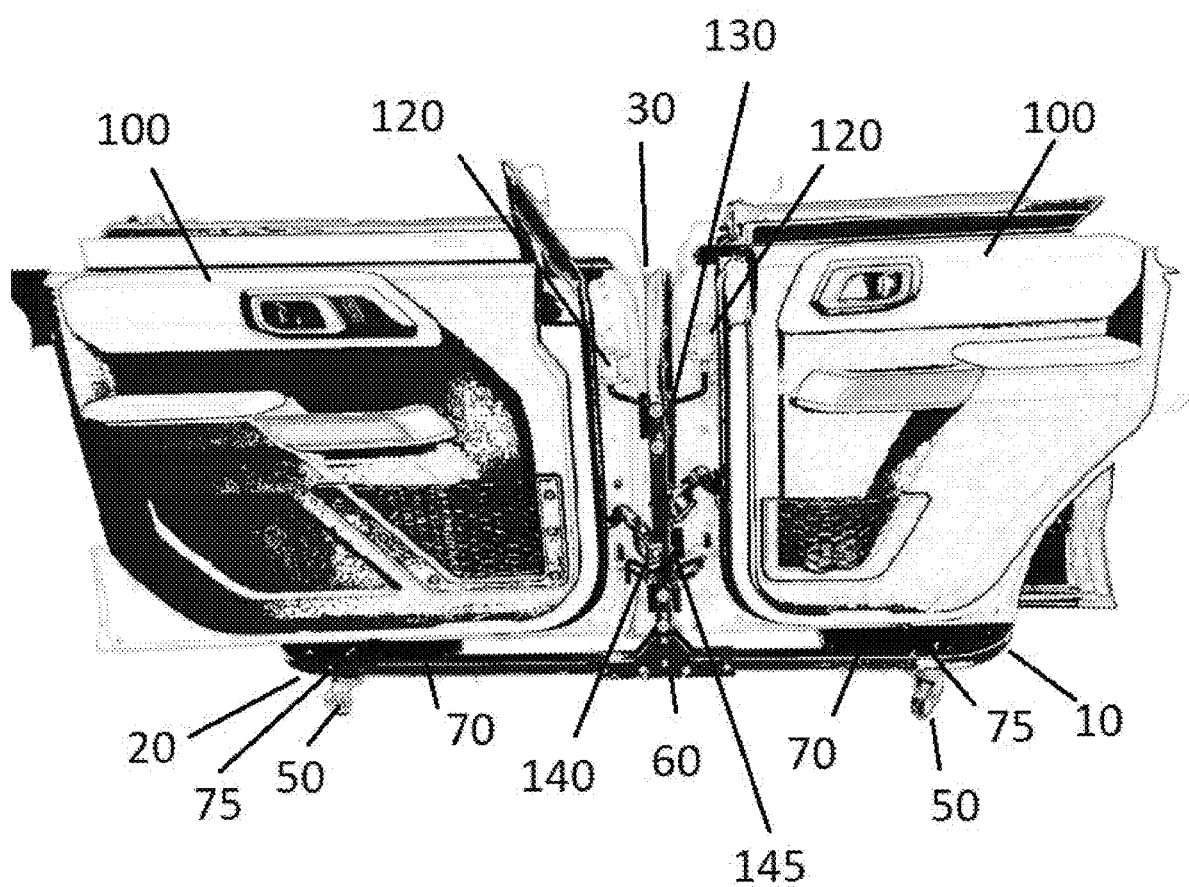

FIG. 9 shows car doors being held by the door holder.

Figure 10:
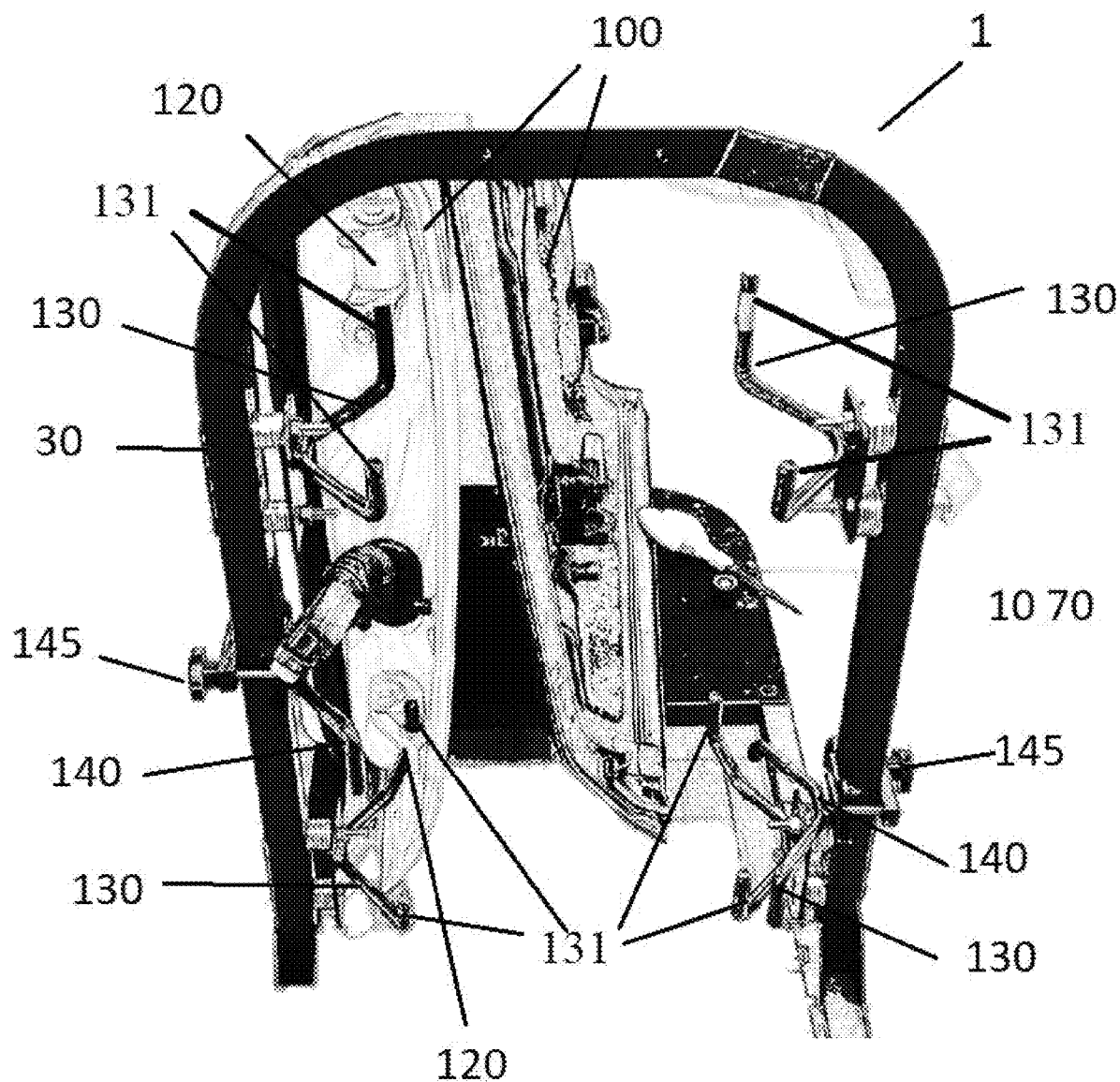

FIG. 10 shows another view of car doors being held by the door holder.

Figure 11:
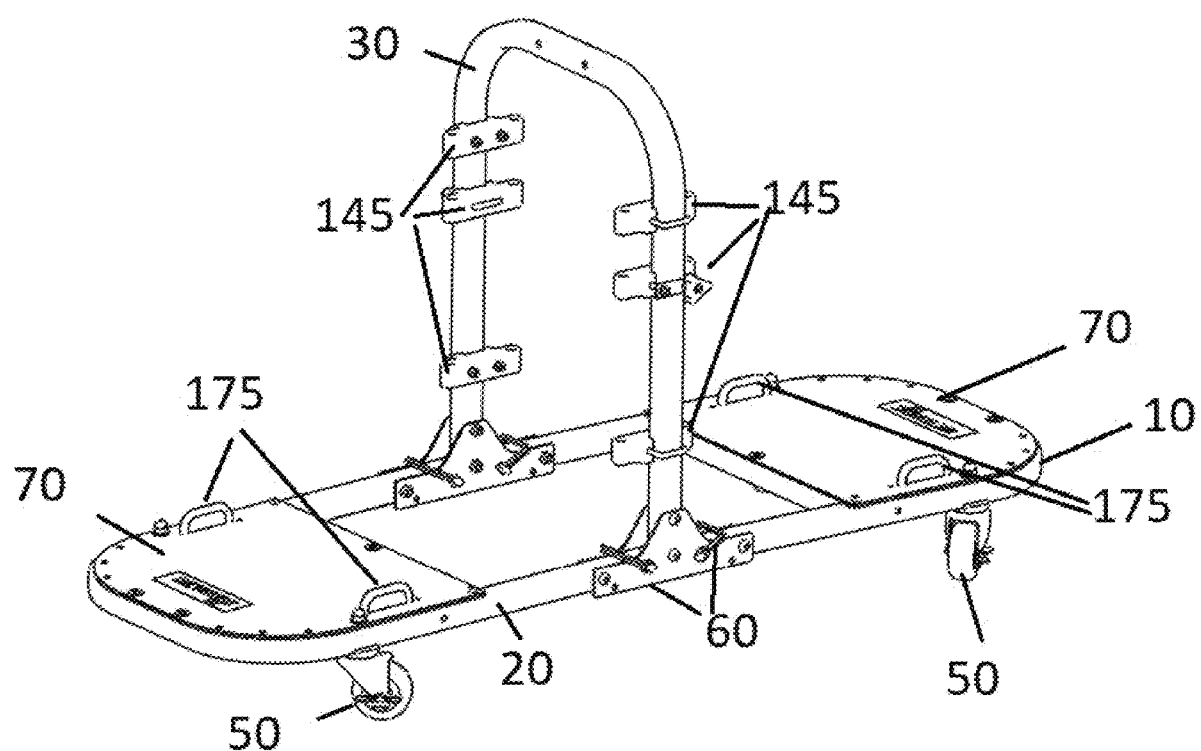
Figure 12:
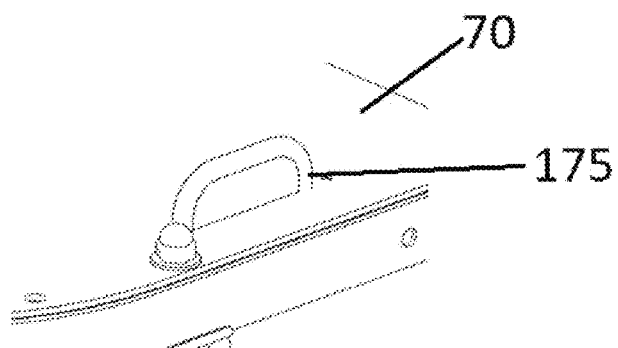

FIG. 11 shows an embodiment with door secure bars/FIG. 12 shows a close up of the door secure bar.

Figure 13:
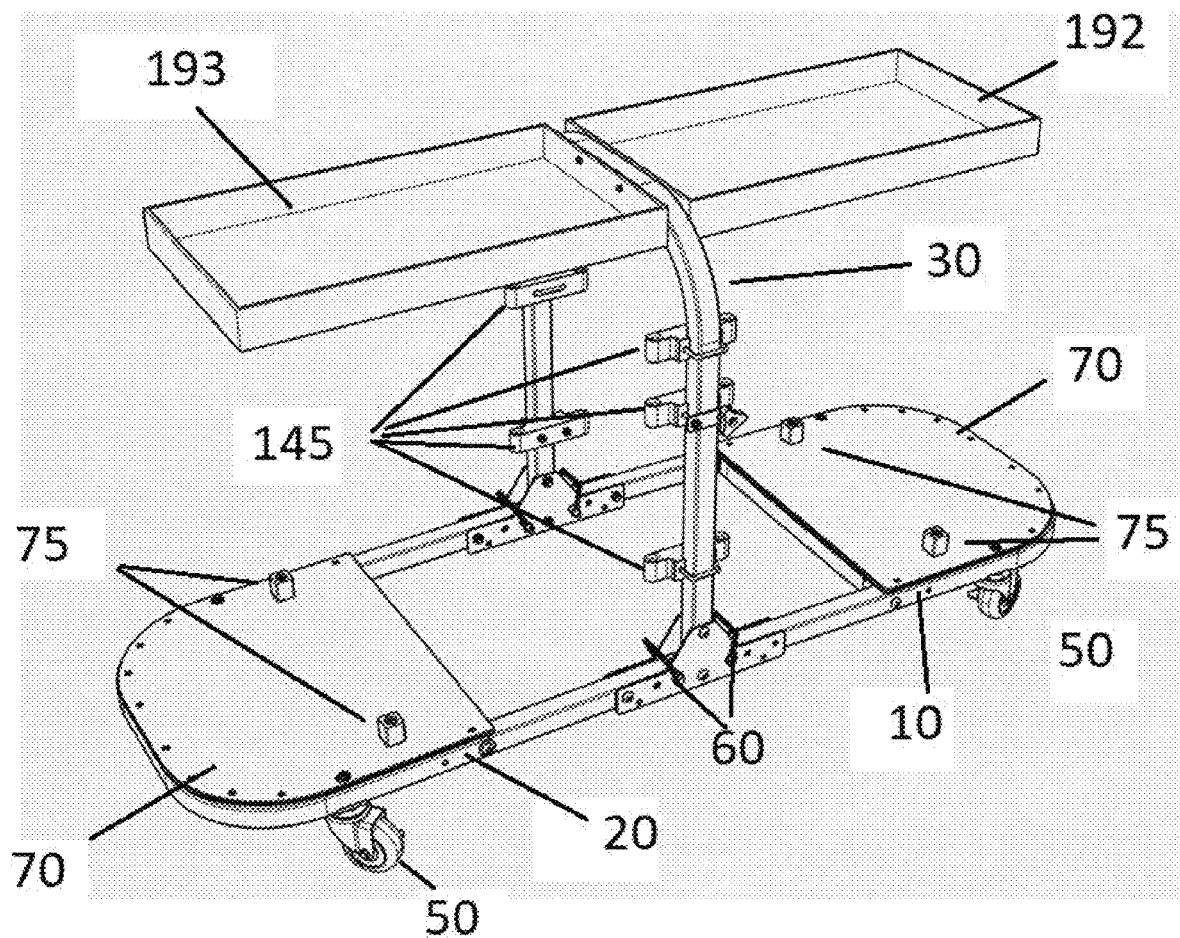

FIG. 13 shows an embodiment with side tables.

Figure 14:
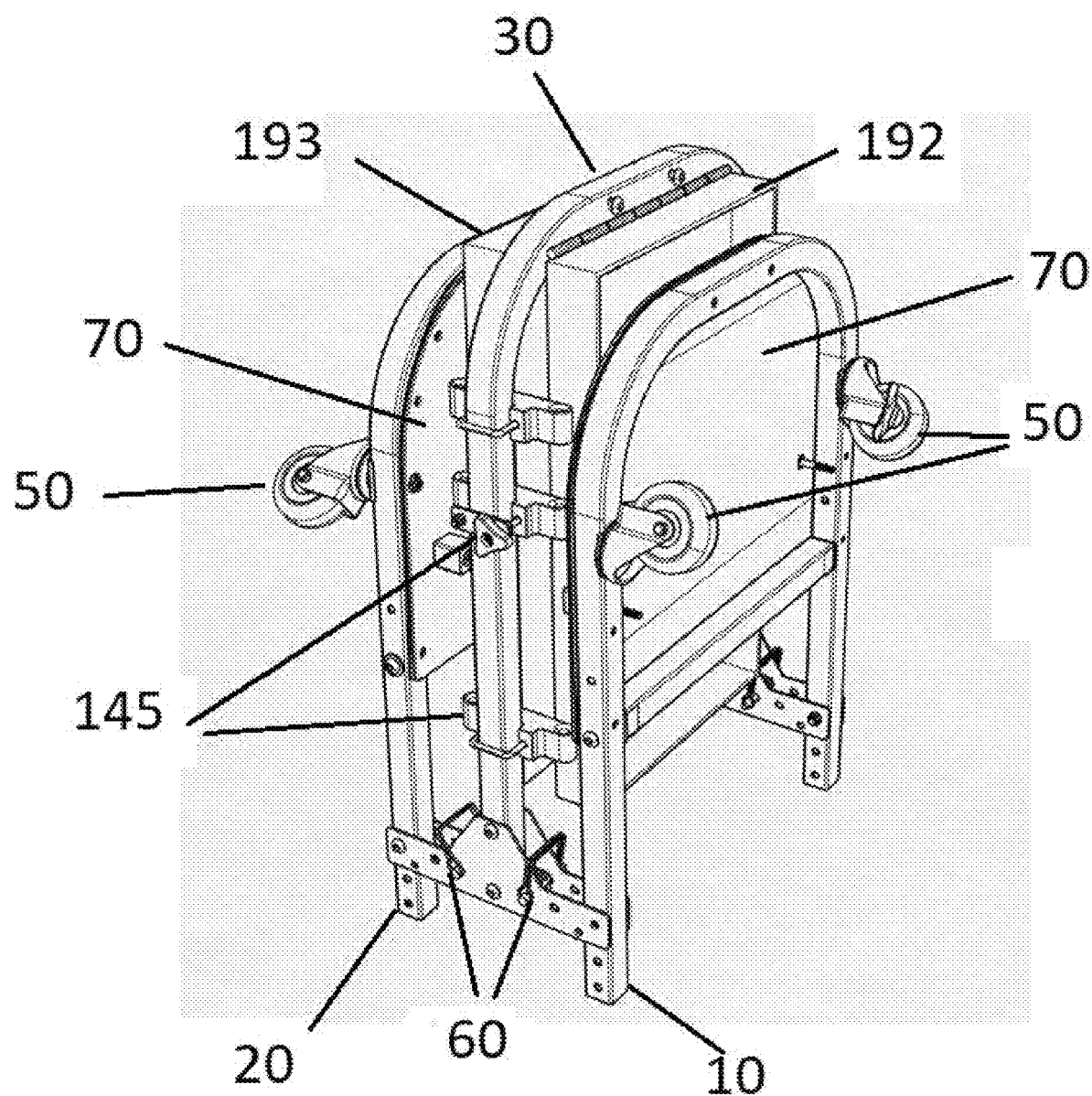

FIG. 14 shows the door holder with side tables in a folded position.

DETAILED DESCRIPTION

The illustrations presented herein are, in some instances, not actual views of any particular framing devices or components thereof but may be idealized representations which are employed to describe the present disclosure. Additionally, elements common between figures may retain the same numerical designation.

FIGS. 1 through 14 shows several embodiments for a foldable door frame holder cart.

Figure 1:
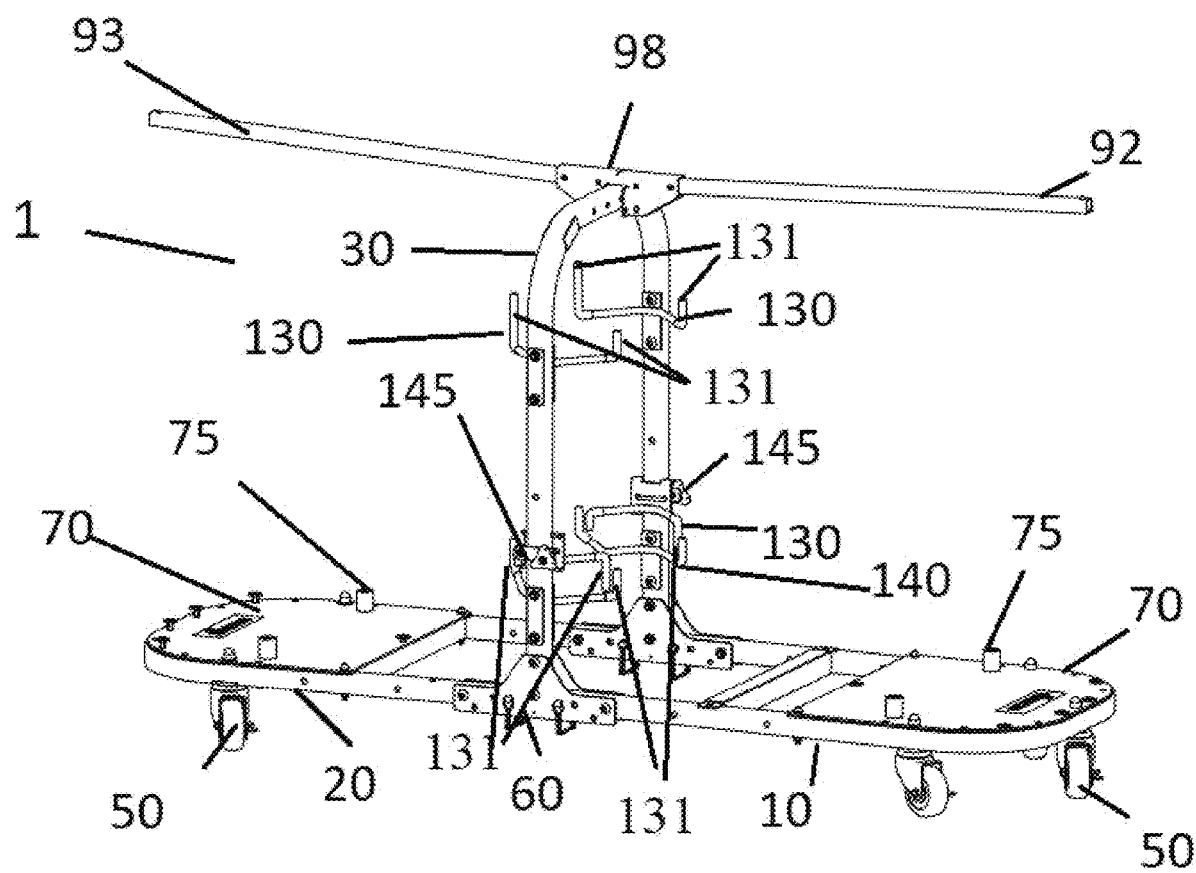
FIG. 1 is a display of one embodiment of a door holder with extendable bars.

FIG. 1 shows an embodiment of the device 1 which is foldable door frame holder cart. The device 1 has a rounded support bar 30 in the middle of a base which in the preferred embodiment is comprised of two halves, a left half 20 and right half 10. The base 10. 20 has a plurality of wheels 50 attached to the bottom of the base and evenly spaced in the preferred embodiment. The device 1 has a plurality door support bars 130 which the hinges 120 of the door frame 100 fit into.

FIG. 1 shows an embodiment with a "T" shape with the right foldable bar 92 and the left foldable bar 93 at the top of the device 1. Extension bars 90 extend perpendicular from the support bar 30. The extension bars 90 connect to the support bar 30 by a support bar hinge 36 and are held in place with a support bar clasp 98. At the distal end of the extension bar 90, the end that does not connect to the support bar 30, connects to the right foldable bar 92 and the left foldable bar 93 by extension bar hinges 98 and secured through extension bar clasps 99.

Figure 2:
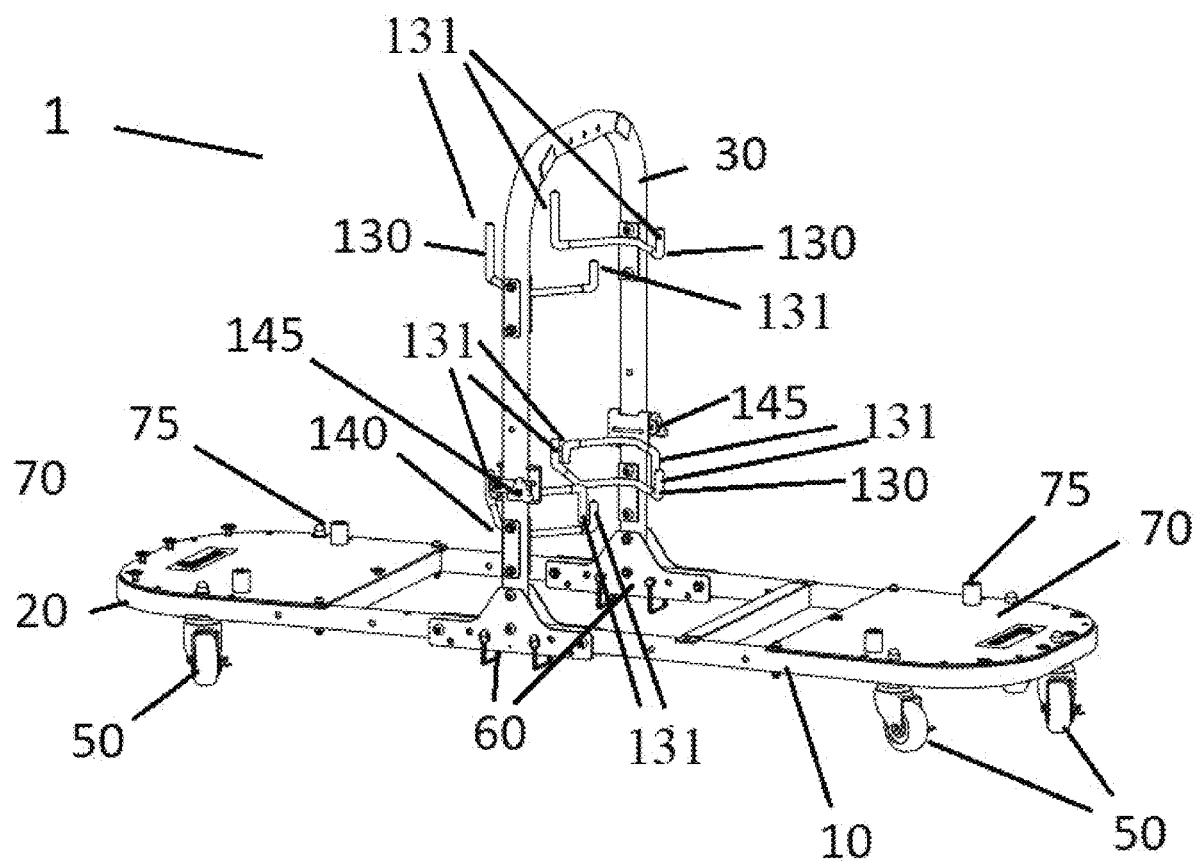
FIG. 2 shows an embodiment of the door holder without extendable bars.

FIG. 2 shows an embodiment without the foldable bars.

Figure 3:
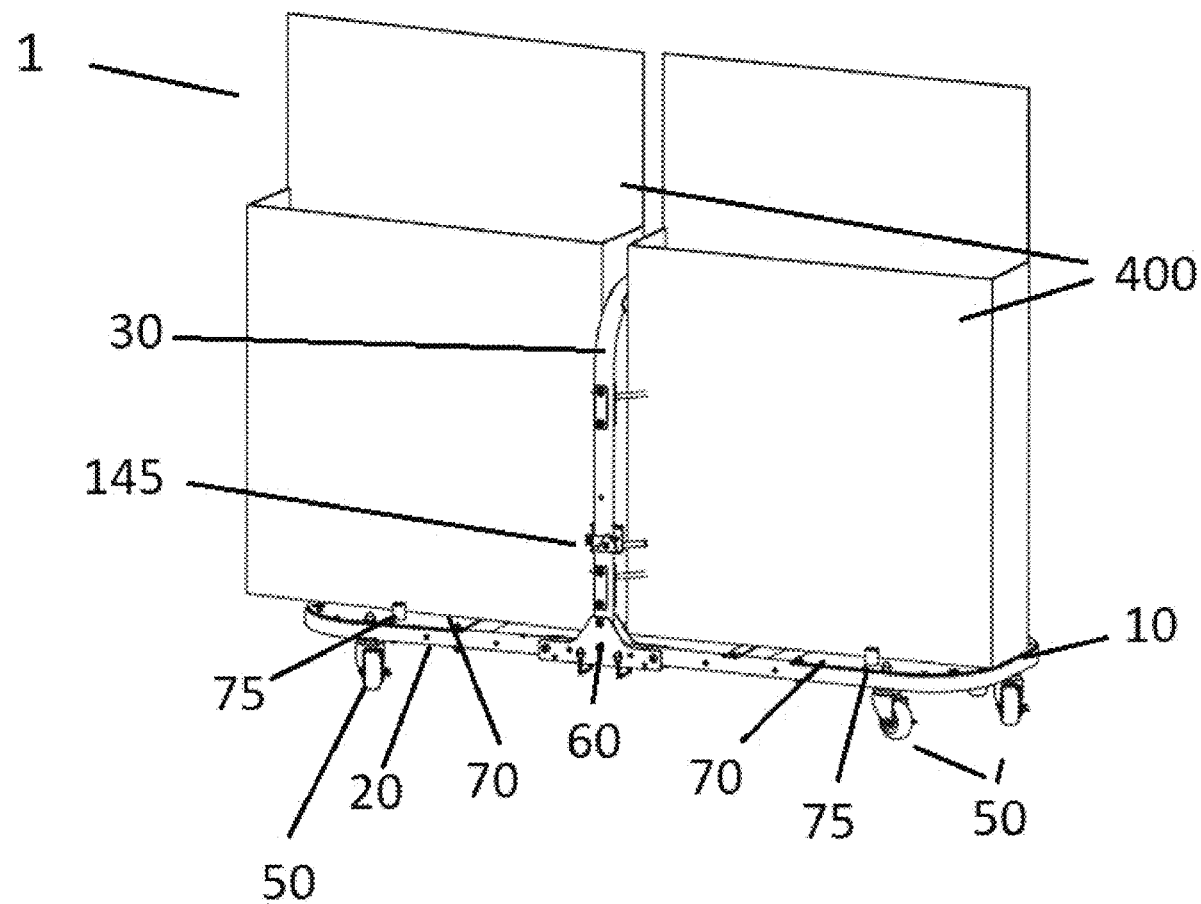
FIG. 3 shows the door holder holding panels.

FIG. 3 shows the device 1 holding panels 400 such as door or roof panels.

Figure 4:
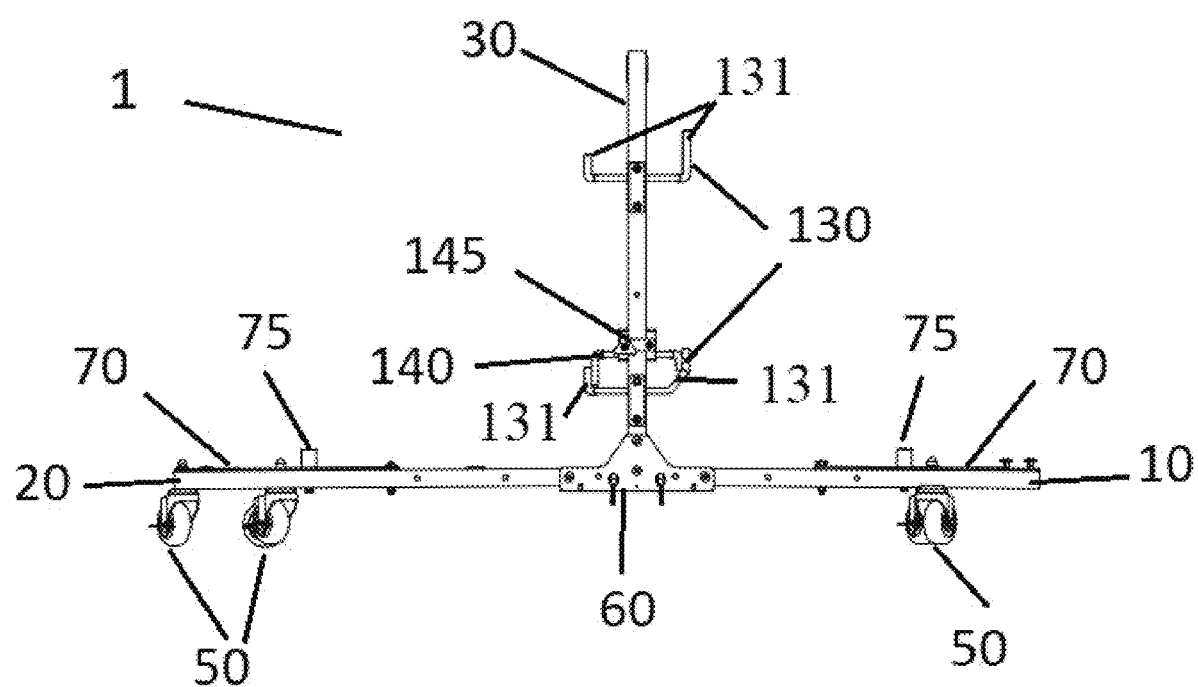
FIG. 4 shows a side view of the door holder.
Figure 5:
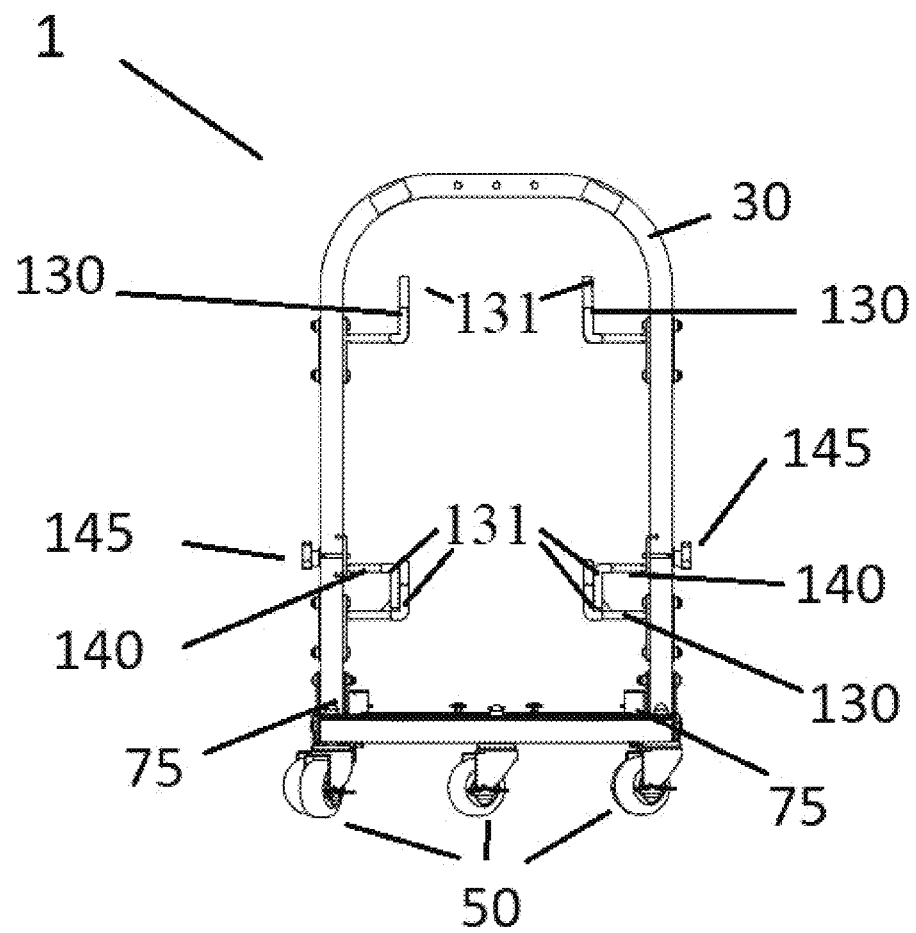
FIG. 5 shows a front view of the door holder.
Figure 6:
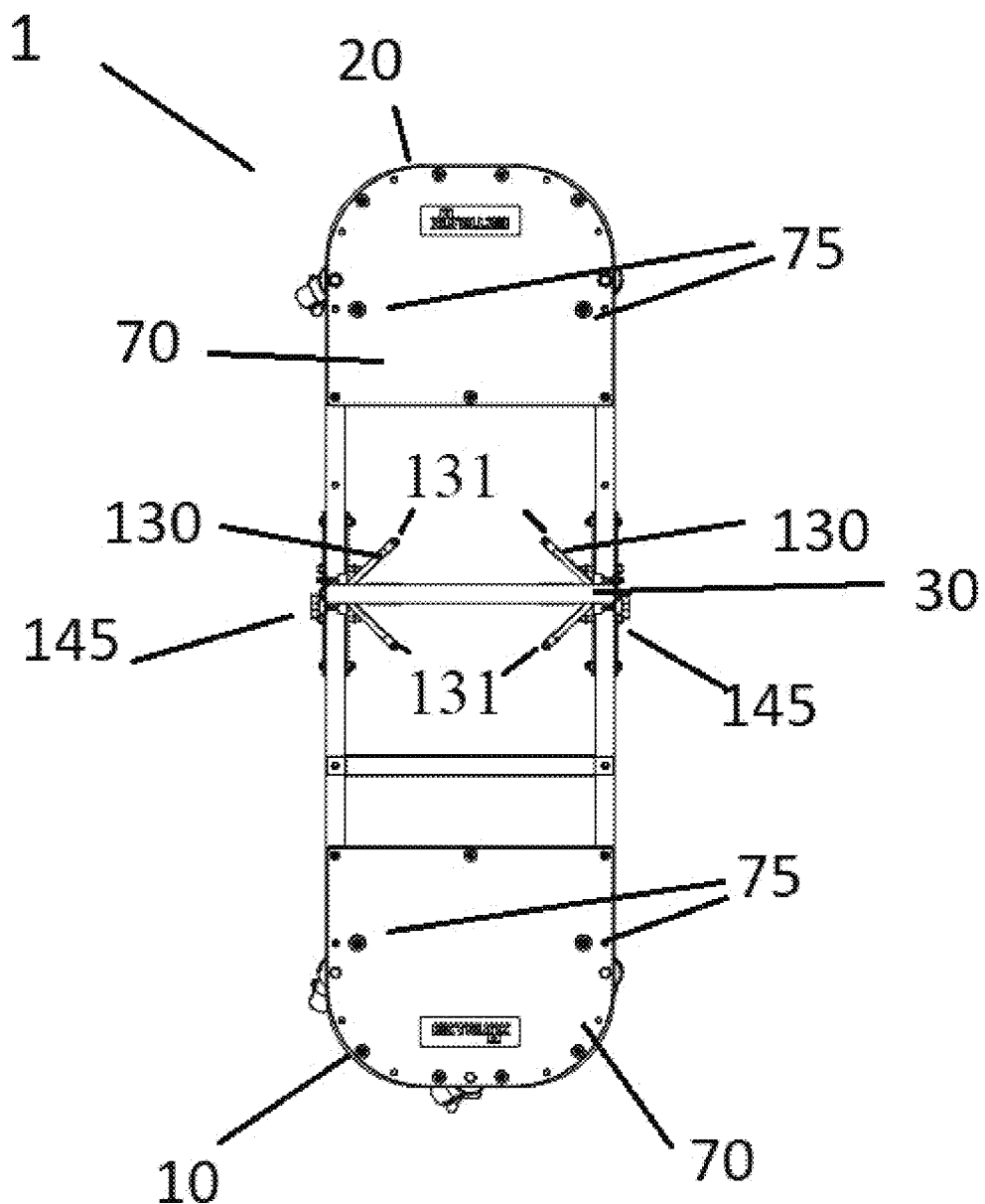
FIG. 6 shows a top view of the door holder.

As shown in FIGS. 4, 5 and 6, the device 1 has a plurality of door support bars 130 and adjustable door locking bars 140 connected to the support bars which the hinges 120 of the door frame 100 fit into. The adjustable door locking bars 140 are connected to a thumb-turn bracket 145 which can be used to better secure the door frame 100 to the device 1. The adjustable door locking bars 140 can be moved on the support bar 30 for proper placement for locking the door frames 100 in place.

The door support bars 130 are connected to the support bar 30 by a connection means such as bolts attached to a support plate. The door support bars 130 can adjustable in its placement on the support bar 30 by attaching it at different location. In the preferred embodiment, the door support bars are cylindrical and extend out at angle away from each other at approximate 45 degree angles with two prongs 131 at the distal end that extends 90 degrees up. The prongs 131 may be different lengths with one prong 131 may be shorter than the other. A Door can be placed on each of the prongs 131. The door support bars 130 can be adjusted to different heights of the door hinges allowing the device 1 to hold different size doors. The prongs 131 can be different heights depending on the doors or items being placed on the cart.

The adjustable door locking bars 140 are connected to a thumb-turn bracket 145 which is connected to the support bar 30 and can move up and down on the support bar 30. In the preferred embodiment, the adjustable door locking bars 140 are cylindrical and have two halves that extend out at an angle away from each other at approximate 45 degree angles with two prongs 131 at the distal end that extends 90 degrees down. The prongs 131 may be of different length with one prong 131 may be shorter than the other.

Each half 10, 20 will have a flat base 70 on its distal end. The distal ends will also be curved in the preferred embodiment with the halves being comprised of bars in the shape of a "U". The proximate ends for the halves will connect to a hinged bracket 60. The hinged bracket 60 connects the left half 20 and the right half 10 together to form the base. The left half 20 and the right half 10 can be secured by securing clasps.

The support bar 30 extends up from the base with a curved distal end and two ends that connect to the two hinged brackets 60.

The door frame 100 is slid or place on the flat base 70 between a plurality set of door secure tabs 75 which extend up from the flat base 70 and are space apart with enough space for the door frame 100 to fit between them. The door secure tabs 75 help secure the door frame 100. The door secure tabs are either cover by or made of a soft material like rubber or plastic so the do not scratch the door frame 100.

The device 1 is foldable has shown in FIGS. 7 and 8. The halves 10, 20 fold in towards the support bar 30 on hinged brackets 60. The proximate ends of the halves forming legs on which the device 1 can stand on.

FIGS. 9 and 10 shows door frames 100 held by the device 1.

The device 1 latches on to doors 100 by having the top door hinges 120 placed on the prong 131 of the top door support bar 130 and the bottom door hinge 120 placed on the prong 131 of the bottom door support bar 130 as shown in FIG. 9. The door locking bar 140 is moved down the support bar 30 using the thumb-turn bracket 145 locking the door 100 into place as shown in FIG. 10. In the preferred embodiment, the prongs 131 are covered with a material such as rubber or foam to protect the surface of the door frame 100. The thumb-turn bracket 145 locks the door frame 100 into place on the cart 1.

In an alternative embodiment as shown in FIGS. 11 and 12, the door frame 100 is slide or place on the flat base 70 between a plurality set of door secure bars 175 which are bars that loop up on two legs that extend up from the flat base 70 and connect to each other with a cross bar. The door secure loops 175 help secure the door frame 100.

FIG. 13 shows an embodiment with side tables. There can be right side table 192 and a left side table 13. Both side tables are attached to the support bar 30 with the left side table 193 attached to the left side of the support bar 30 and the right side table 192 is attached to the right side of the support bar 30. The side tables can be flat or in the shape of bins with a flat surface and raised sides as shown in FIGS. 13 and 14. FIG. 14 shows the door holder with side tables in a folded position. The side tables are perpendicular to the support bar 30.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A foldable door cart comprising:
   a base, wherein said base is comprised of two halves, a left half and right half;
   a plurality of wheels that extend from a bottom of said base;
   a support bar that extends from said base;
   a plurality of door secure bars;
   a plurality of door support bars connected to the support bar of the base;
   a plurality of adjustable door locking bars connected to the support bar of the base;
   wherein hinges of a door frame fit into the door support bars and adjustable door locking bars;
   wherein the adjustable door locking bars are connected to the support bar by a thumb-turn bracket, said thumb-turn bracket is used to secure the door frame to the cart;
   wherein the door support bars extend outwards at an angle away from the support bar, with a prong at each of two distal ends of each door support bar, wherein each prong extends upwards relative to the base.

2. The foldable door cart according to claim 1, further comprising: wherein one prong is shorter than the other.

3. The foldable door cart according to claim 1, further comprising: wherein the door is placed on each of the prongs.

4. The foldable door cart according to claim 3, further comprising: wherein a respective door locking bar is moved down the support bar locking the door.

5. The foldable door cart, according to claim 1, further comprising: extension bars extending perpendicularly from the support bar.

6. The foldable door cart, according to claim 1, further comprising: tables extending perpendicularly from the support bar.

7. The foldable door cart, according to claim 6, further comprising: wherein the tables are flat.

8. The foldable door cart, according to claim 6, further comprising: wherein the tables are bin-shaped.

9. A foldable door cart comprising:
   a base, wherein said base is comprised of two halves, a left half and right half;
   a plurality of wheels that extend from a bottom of said base,
   a support bar that extends from said base;
   a plurality of door support bars connected to the support bar of said base,
   wherein the door support bars extend outwards at an angle away from the support bar, with a prong at each of two distal ends of each door support bar, wherein each prong extends upwards relative to the base, wherein one prong is shorter than the other;
   a plurality of adjustable door locking bars connected to the support bar of the base,
   wherein hinges of a door frame fit into the door support bars and adjustable door locking bars;
   wherein the adjustable door locking bars are connected to the support bar by a thumb-turn bracket which is used to secure the door frame when the door frame is placed on each of the prongs of the door support bars;

wherein a respective door locking bar is moved down the support bar by using the thumb-turn bracket and thereby locking the door onto the cart.

* * * * *